(12) United States Patent
HongQian et al.

(10) Patent No.: US 8,560,852 B2
(45) Date of Patent: Oct. 15, 2013

(54) METHOD AND SYSTEM FOR COMMUNICATION BETWEEN A USB DEVICE AND A USB HOST

(75) Inventors: Lu Karen HongQian, Austin, TX (US); Stephane Durand, Meudon (FR); Laurent Castillo, Meudon (FR); Asad Ali, Austin, TX (US); Ed Dolph, Austin, TX (US)

(73) Assignee: Gemalto SA, Meudon (FR)

( * ) Notice: Subject to any disclaimer, the term of this patent is extended or adjusted under 35 U.S.C. 154(b) by 758 days.

(21) Appl. No.: 12/525,625

(22) PCT Filed: Feb. 1, 2008

(86) PCT No.: PCT/IB2008/000225
§ 371 (c)(1),
(2), (4) Date: Feb. 17, 2010

(87) PCT Pub. No.: WO2008/096220
PCT Pub. Date: Aug. 14, 2008

(65) Prior Publication Data
US 2010/0146279 A1    Jun. 10, 2010

Related U.S. Application Data

(60) Provisional application No. 60/888,288, filed on Feb. 5, 2007.

(51) Int. Cl.
G06F 21/00    (2013.01)

(52) U.S. Cl.
USPC ........ 713/172; 726/2; 726/9; 726/20; 726/27; 726/29

(58) Field of Classification Search
USPC .......................................................... 713/172
See application file for complete search history.

(56) References Cited

U.S. PATENT DOCUMENTS

| | | | |
|---|---|---|---|
| 6,263,392 B1* | 7/2001 | McCauley | 710/305 |
| 2002/0078367 A1* | 6/2002 | Lang et al. | 713/200 |
| 2002/0199037 A1* | 12/2002 | Tasler | 710/1 |
| 2003/0208651 A1* | 11/2003 | Wurzburg | 710/303 |
| 2004/0073726 A1* | 4/2004 | Margalit et al. | 710/72 |
| 2004/0093454 A1* | 5/2004 | Teng | 710/310 |

(Continued)

FOREIGN PATENT DOCUMENTS

| | | |
|---|---|---|
| EP | 1 486 866 A1 | 12/2004 |
| EP | 1 672 492 A1 | 6/2006 |
| WO | 02/093468 A1 | 11/2002 |
| WO | 2004/034202 A3 | 4/2004 |

OTHER PUBLICATIONS

Hanushevsky, Andrew, Security in the IEEE Mass Storage System Reference Model, Apr. 1993, Proceedings of the Twelfth IEEE Symposium on Mass Storage Systems, pp. 67-77.*

(Continued)

Primary Examiner — Taghi Arani
Assistant Examiner — Kenneth Chang
(74) Attorney, Agent, or Firm — Pehr B. Jansson; The Jansson Firm

(57) ABSTRACT

A secure portable electronic device for providing secure services when used in conjunction with a host computer having a central processing unit use two hardware device protocols readily supported by computer operating systems. Other systems and methods are disclosed.

16 Claims, 12 Drawing Sheets

(56) References Cited

U.S. PATENT DOCUMENTS

| | | |
|---|---|---|
| 2004/0098596 A1* | 5/2004 | Elteto et al. .................. 713/185 |
| 2004/0193744 A1* | 9/2004 | Paley et al. ........................ 710/5 |
| 2004/0225918 A1* | 11/2004 | Fruhauf et al. .................. 714/30 |
| 2004/0229595 A1* | 11/2004 | Laursen et al. ............... 455/403 |
| 2005/0060479 A1* | 3/2005 | Deng et al. .................... 710/306 |
| 2006/0165060 A1* | 7/2006 | Dua .............................. 370/352 |
| 2006/0230202 A1* | 10/2006 | Lee ................................ 710/62 |

OTHER PUBLICATIONS

International Search Report from PCT/IB2008/000225 dated Jul. 31, 2008 (3 pages).

Written Opinion from PCT/IB2008/000225 dated Jul. 31, 2008 (7 pages).

* cited by examiner

151

153

155

159

METHOD AND SYSTEM FOR COMMUNICATION BETWEEN A USB DEVICE AND A USB HOST

BACKGROUND OF THE INVENTION

The present invention relates generally to provision of security services to Internet applications and more particularly to facilitating communication between a secure portable device and a host computer wherein the secure portable device is engaged in communication with a remote server via the host computer.

Co-pending patent application Ser. No. 11/564,121 describes a system and method for enabling the secure portable device to plug-and-play without installing any software on the host device. In that system the secure portable device is connected to a host computer. The secure portable device, for example, in non-volatile memory contains a card agent and a host agent. The card agent and host agent is both a division of labor of security functionality, e.g., cryptography services, between the secure portable device and the host computer, and a mechanism for providing security in the communication to the remote server.

The level of security and efficiency are trade-offs in determining how to divide responsibilities between the card agent and host agent. The more tasks that are placed on the card agent, which is executing on the secure portable device, the higher the security but the lower the performance as typically secure devices are more secure than host computers but do not provide as high performance. On the other hand, the more tasks that are placed on the host agent, which, is executing on the host computer, the higher the performance, but the lower the security as the host computer typically is not as secure as a secure device, but usually provides much more computing power and hence higher performance.

The co-pending patent application Ser. No. 11/564,121 presents a communication methodology for communication between the card-agent executing on the secure token and the host-agent executing on the host computer. That communication methodology uses the USB mass storage protocol for communicating data between the two devices. Similarly published US Patent Application Pub. No. 2004/0098596 to Laszlo Elteto, et al., entitled Driverless USB Security Token describes a security token in which data communication between the token and the host computer is performed over any of several communications protocols, e.g., USB mass storage or USB Human Interface Device protocols. While using USB mass storage protocol for data communication is a technique that is useful for providing a plug-and-play secure token, i.e., one in which no middleware must be pre-installed on the host computer to facilitate use of a secure token, it is not a particularly efficient mechanism for communicating the availability of data. The USB mass storage protocol, because the requirement to read a data buffer to determine whether any data has been placed in that data buffer, requires the participants in a communications session to poll designated mass storage data buffers to determine the issuance of communications messages. That is not very efficient.

Secure communication is usually achieved by having some level of authentication between communication participants and securing subsequent communications by an encryption/decryption mechanism. Not all communications with a secure token justifies the same level of communications security. A secure token as presented in co-pending patent application Ser. No. 11/564,121 may be used for a variety of purposes.

From the foregoing it will be apparent that there is a need for an improved method to indicate the availability of data communicated between a secure portable device and remote servers over the USB mass storage protocol. Furthermore, it is desirable to provide a mechanism that provides multiple levels of security of the communication between a computer and a secure token in an efficient manner.

A solution is detailed in the annexed set of claims.

DETAILED DESCRIPTION OF THE PREFERRED EMBODIMENTS

Figure 1:
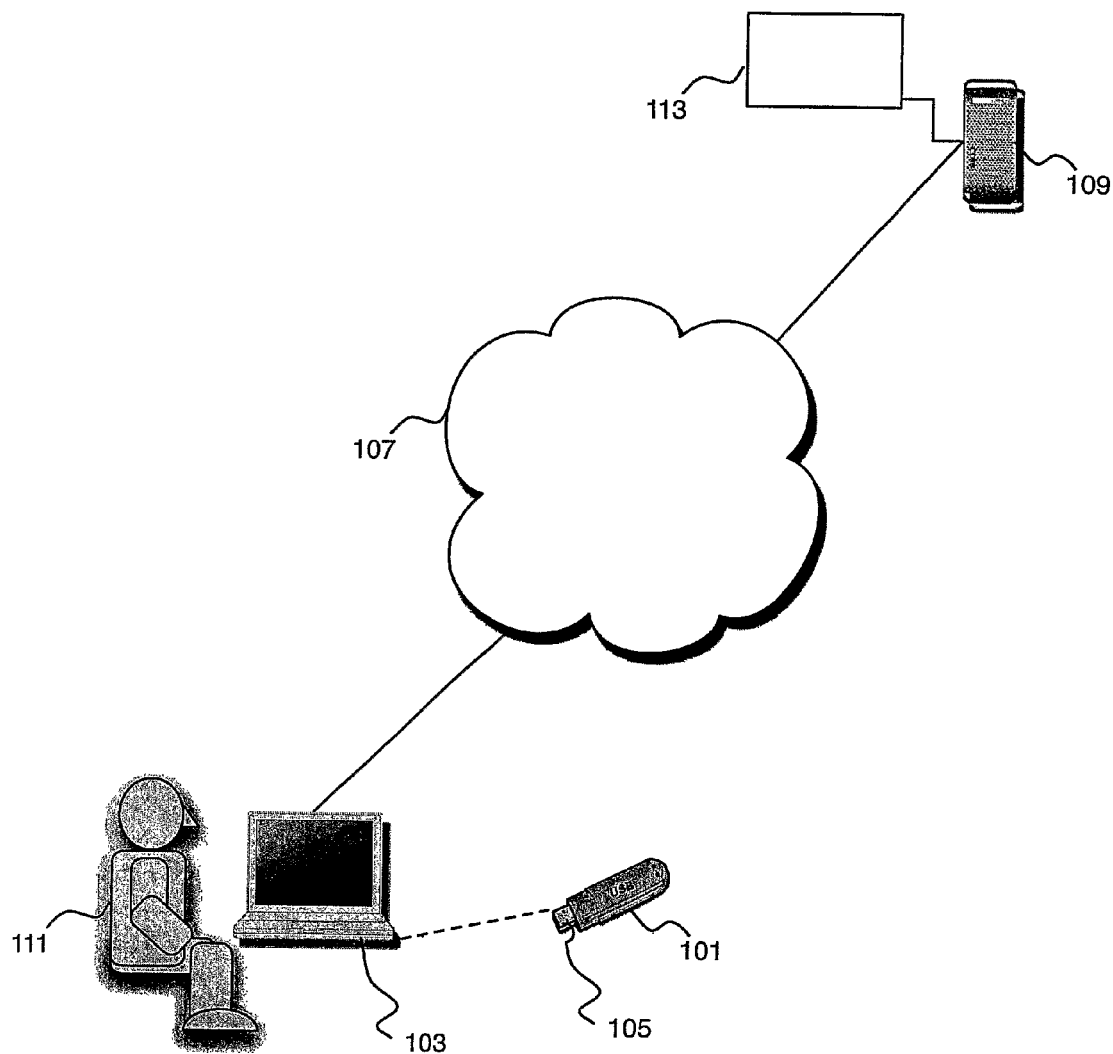
FIG. 1 is a block diagram illustrating an example scenario in which a smart card is used to access services on a remote server.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A security device as described in co-pending patent application Ser. No. 11/564,121. Ser. No. 11/564,121 provides a self-contained infrastructure that is automatically shared with a host computer to which the security device is connected. The security device, hereinafter, for illustrative purposes, a smart card, is configured to be connected, to a host computer using a standard peripheral connection and to behave as a device normally connected to such a standard peripheral connection. The smart card communicates with the host computer using the communications protocol associated with the standard peripheral connection.

In one embodiment, that connection is a Universal Serial Bus (USB) connection and the smart card appears to the host computer as a USB mass storage device. As such, the smart card communicates with the host computer using communications protocol such as the USB mass storage protocol. Upon connecting the security device to a host computer, a special program used for communication with the host computer, the card agent starts executing on the smart card. Next, another special program, the host agent, stored on the smart card, is automatically launched on the host computer. The host agent and card agent communicate over a special communications protocol for providing secure communications there between. In one embodiment, that special communications protocol is carried over the USB mass storage protocol.

By providing a standard hardware interface, one that is available on virtually every modern computer, and by communicating over a standard protocol, while providing the host agent and card agent functionality, a smart card according to the invention, may provide a hitherto unavailable advantage of providing the security functionality of a smart card without requiring any special hardware or software on the host computer. Thus, a person carrying such a smart card may achieve the hitherto unavailable advantage of connecting that smart card to virtually any computer, e.g., one provided in a public place, a friend or co-worker's computer, or even, a totally untrusted computer, and achieve a secure communication between the smart card and a remote service. Availability of such smart cards makes new uses of smart cards possible because there is no longer a requirement of a special card reader or middleware.

The communication between a host computer and a smart card is described in co-pending patent application Ser. No. 11/564,121 is primarily described in the context of the USB mass storage protocol other communications protocols are possible alternatives for alternative embodiments. A difficulty with using the USB mass storage protocol for data communication is that the protocol does not provide a convenient mechanism for making a communications participant aware that the other communications participant has made some data available in the communications buffers. Therefore, polling the buffers, a costly operation, is performed. The system and method described herein provides an efficient and flexible method for signaling the availability of data in the communications data buffer.

Furthermore, the system and method herein provides a flexible and efficient mechanism for providing different application layer communications protocol levels wherein the different levels may be used to provide for security mechanisms tailored to the objective of the communication performed. For example, access to private areas may require a particular security policy whereas ordinary APDU communication to invoke public methods on the smart card, the standard form of communication between computers and smart cards, may not require as rigorous security policy.

1. Introduction

FIG. 1 is a block diagram illustrating an example scenario in which a smart card is used to access services on a remote server. A smart card 101 is connected to a host computer 103 using a standard connector 105. The host computer 103, in turn, is connected to a network 107, e.g., the Internet. At a remote location on the network 107, a server computer 109 is connected. A user 111, for example, the owner of the smart card 101, wishes to access a service 113 provided by the server 109. Consider, as an example, that the service 113 requires the user 111 to identify himself using a username and password. The user 111 (or a service provider) has previously stored the user's username and password on the smart card 101. If the user 111 cannot trust the host computer 103, there is a risk that the host computer 103 would capture the username and password, if the user 111 merely types in the username and password using the keyboard of the computer 103. Alternatively, the user 111 can direct the smart card 101 to transmit the username and password directly to the remote service 113. That is also problematic. Malware installed on the host computer 103 or elsewhere on the path between the smart card 101 and the remote service 113 may capture the username and password by snooping on the communication.

While the discussion herein, for purposes of providing an illustrative example, is directed to the use of a smart card 101 with a host computer 103, many alternatives exist. For example the smart card 101 may be a SIM card used in a mobile telephone; in which case, the host computer 103 would be such a mobile telephone. The smart card 101 may also be substituted with other forms of secure portable devices, e.g., a USB token with a memory card and secure integrated circuit. It should also be noted that while the illustration of FIG. 1 shows a USB dongle form factor for the smart card 101 and corresponding interface device, that is also only for the purpose of illustration. The embodiments described herein are applicable to any other smart card or secure memory form factor and corresponding interface devices, e.g., but not limited to, the traditional credit card sized smart card form factor used in conjunction with a smart card reader.

Figure 2:
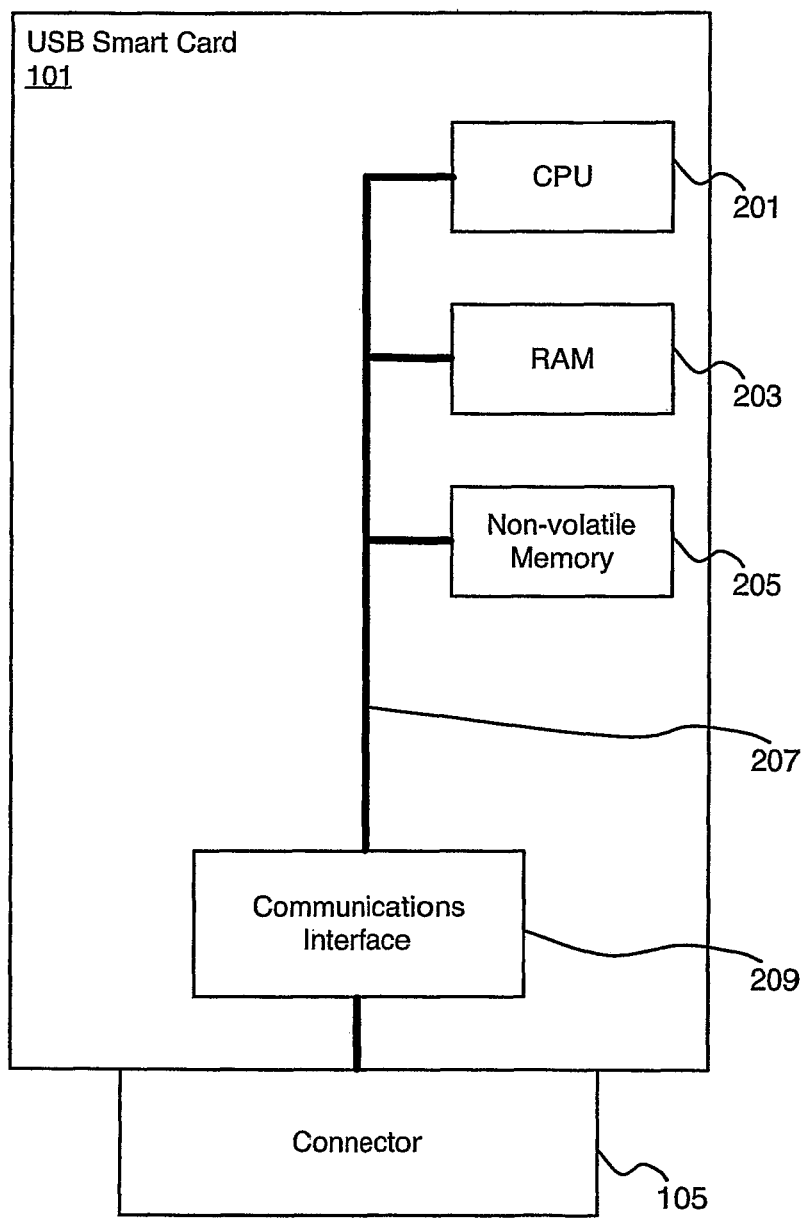
FIG. 2 is a block diagram illustrating a high-level view of the architecture of a smart card of FIG. 1.

FIG. 2 is a block diagram illustrating a high-level view of the architecture of a smart card 101. As illustrated in FIG. 1, the smart card 101 is equipped with a standard peripheral hardware connector 105, e.g., a USB connector. The smart card 101 contains a central processing unit 201, a RAM 203, and a non-volatile memory 205. These components are connected via a bus 207. Also connected to the bus 207 are a communications hardware interface 209 for providing a connection between the bus 207, and consequently, the CPU 201, RAM 203, and non-volatile memory 205, and the connector 105.

Figure 3:
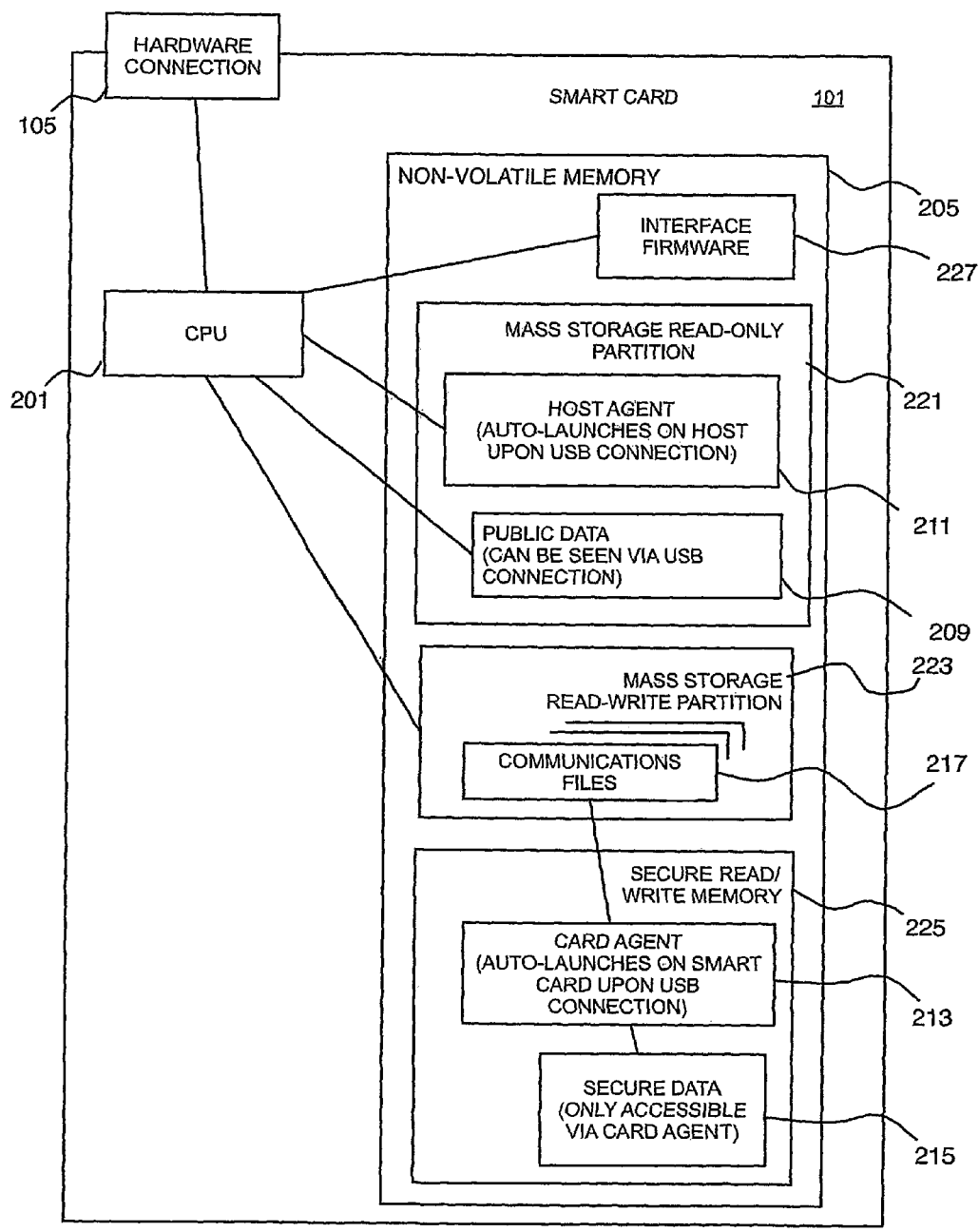
FIG. 3 is a block diagram illustrating the architectural organization of programs over the hardware components of the smart card FIG. 2, including illustrating a host agent and card agent both stored in memory of the smart card.

FIG. 3 is a block diagram illustrating the architectural organization of programs over the hardware components of the smart card 101. The hardware connection between the smart card 101 and the host computer 103 is achieved using the hardware connector 105. The communication on the hardware connection uses the USB mass storage protocol. The CPU 201, executing an interface firmware module 227, which is stored as firmware on the smart card 101, manages that communication. As such, the interface firmware module 227 is located in the non-volatile memory 205 or in Read Only Memory (ROM). The interface firmware module 227 implements the USB mass storage protocol such that the host computer 103 perceives the smart card 101 to be a USB mass storage device.

In alternative embodiments, the communication between the smart card 101 and the host computer 103 is performed according to other communications protocols. For example, the smart card 101 may enumerate at start up as another type of peripheral device, e.g., a CD ROM, in which case the interface firmware module 227 implements the appropriate communications protocol.

The non-volatile memory 205 of the smart card 101 contains three areas: a mass storage read-only partition 221, a mass storage read-write partition 223, and a secure read/write memory 225. The mass storage read-only partition 221 and the mass storage read-write partition 223 are accessible from external devices, e.g., the host computer 103. However, while external devices, e.g., host computer 103, can write to the read-write partition 205, in one embodiment, the read-only partition may be written to by the CPU 201 of the smart card 101, i.e., the read-only partition 203 is read-only with respect to external devices, but not necessarily to the smart card 101. Conversely, the secure read/write memory 225 may not be accessed directly from external devices for either read or write operations. Because all interactions are managed by the interface firmware 227, the interface firmware 227 can control access to various parts of the non-volatile memory 205 or files stored in the non-volatile memory 205 so that, for example, only the card agent 213 can access the secure data 215 (described herein below).

The mass storage read-only partition 221 contains public data 209 that may be accessed from any host computer 103 to which the smart card 101 may be connected. The mass storage read-only partition 221 also contains a program, the host agent 211, which is auto-launched on the host computer 103 when the smart card 101 is connected to the host computer 103 via the hardware connection 105. The USB mass storage standard provides that a USB mass storage device may include a trigger file called autorun.inf that is a script that automatically is executed when the device is connected to a host computer 103. Alternatively, the host agent 211 is visible from the file browser of the host computer's 103 operating system. A user 111 launches the host agent 211 manually, for example, by clicking on the icon corresponding to the host agent 211 in the file browser. Table I is a code example of one possible autorun.inf file to launch the host agent 211 on the Microsoft Windows Application Program Interface known as Win32:

TABLE 1

Example Autorun.inf to launch the host agent 211.

[autorun]
shellexecute=hagent_r.exe
action=Launch the Network Card Host Agent
label=NetCard Host
UseAutoPlay=0

When a user 111 inserts the smart card 101 into the appropriate slot on a host computer 103, the operating system (e.g., Microsoft Windows) displays a dialog box allowing the user 111 to select the action "Launch the Network Card Host Agent". If the user 111 accepts that action, the host agent 211 ("hagent_r.exe" in the example code) is executed by the host computer 103.

The secure read/write memory 225 contains a module called the card agent 213. The smart card 101 is configured such that, when the smart card 101 is connected to a host computer 103, i.e., when a USB connection has been established between the smart card 101 and the host computer 103, the CPU 201 launches (i.e., executes) the card agent 213. As described in greater detail below, in one embodiment, the card agent 213 is the only program through which certain secure data 215 may be accessed.

Typically a USB mass storage device is used to store data files. USB memory sticks are one example of a USB mass storage device. A USB memory stick functions as a very compact and easily transportable non-volatile storage device. A user uses such a device to store data files.

The mass storage files are files with public access that are exposed by the smart card 101 and accessible from the host computer 103. The host agent 211 has direct access to these files. Examples of these files can be HTML, image, JavaScript, CSS files, as well as public key certificates. All files accessible through the mass storage interface are read-only files for the host computer 103. The only exception is a set of communications files 217 in the mass storage read-write partition 223; for example, according to one embodiment of the invention, the communication channel between the host agent 211 and the card agent 213 is based on mass storage files. These files are read-write files.

Thus, to achieve a communication according to the USB mass storage protocol between the card agent 213 and the host agent 211, when the host agent 211 is executing on the host computer 103, the card agent 213 and host agent 211 writes communication data files 217 in the mass storage read-write partition 223. The nature of that communication is described in greater detail herein below.

Figure 4:
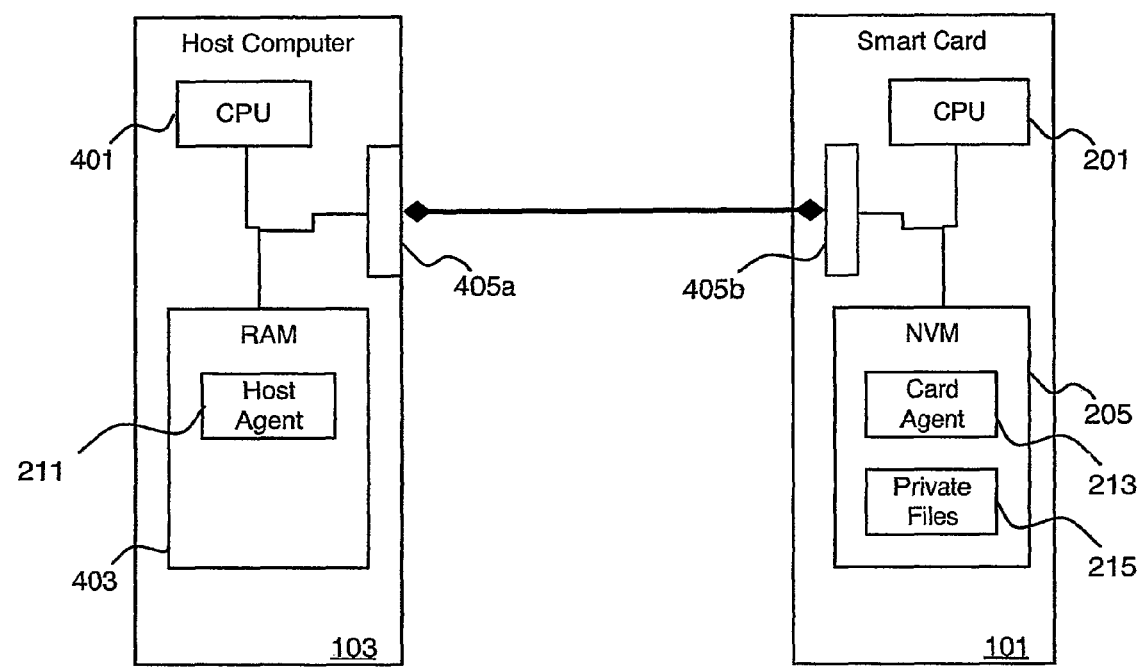
FIG. 4 is a block diagram illustrating the loading of the host agent of FIG. 3 into Random Access Memory (RAM) of the host computer to which the smart card is connected.

FIG. 4 is a block diagram illustrating the loading of the host agent 211 into the RAM 403 of the host computer 103. The CPU 401 of the host computer 103, then executes the host agent 211. The host agent 211 communicates with the card agent 213, which executes in the smart card 101 and executed by the CPU 201 of the smart card 101. The card agent 213 has access to private files 215 for certain calculations, providing services to the host agent 211. Communication between the host agent 211 and the card agent 213 is performed via the host-side USB mass storage interface 405a and the smart card-side USB mass storage interface 405b (collectively, 405).

The architecture illustrated in FIGS. 1-4 provides a framework in which a smart card 101 can provide security and convenience of services for Internet applications. In one embodiment, the components involved rely solely on the USB mass storage interface for connectivity and do not require the smart card 101 to implement networking protocols, such as TCP/IP, DHCP server, or DNS server, in order to provide services. The architecture avoids the burden of implementing a network communications stack, DHCP server, or a DNS server on the smart card 101. In one class of solutions using a smart card 101, as described herein, dealing with authentication and secure Internet access, the smart card 101 may include the following components:

An interface capable of enumerating as a USB mass storage device and an internal secure file system.
SSL/TLS library, in client and server mode
OATH, etc. for OTP
HTTPS web server
HTTPS agent
Application programs The smart card 101 enumerates as a USB mass storage device and contains a private file system 215. The components used for providing security services may be split between the host computer 103 and the smart card 101. These components are divided between the smart card 101 and the host computer 103 into two main logical pieces, namely, those provided by the host agent 211 and those provided by the card agent 213. All functionality provided by connecting the smart card 101 is contained in these two main components, divided judiciously to suit a particular preference for security vs. performance trade-off. The host agent 211 and the card agent 213 communicate with each other using a mass storage interface as an I/O channel. In one embodiment, the communication is encrypted by the host agent 211 and the card agent 213 to prevent access by a third party along a communications path from the smart card 101 to the host computer 103 or a remote server 109.

The actual division of workload between host agent 211 and card agent 213 is driven by the security versus performance considerations. On one end of the security/performance spectrum, the card agent 213 contains implementation of all the security components provided through the smart card 101 and the host agent 211 merely acts as a thin proxy. That solution is a very secure solution but may not have an acceptable level of performance for certain classes of applications. On the other end of the spectrum all features are run on the host computer 103. That solution has excellent performance characteristics but offers little in way of security. The architecture provided herein offers flexibility in defining the right balance between security and performance. One embodiment is described herein below as one possible example of a division of tasks between the card agent 213 and the host agent 211 where performance is significantly improved with very little compromise in regard to security.

As is described in the co-pending patent application Ser. No. 11/564,121, the communication between the host agent 211 and the card agent 213 is secured by a shared session key, $K_S$. The shared session key, $K_S$, is initialized from an initial shared session key, $K_{SS}$, or shared master secret key, $K_M$.

Figure 5:
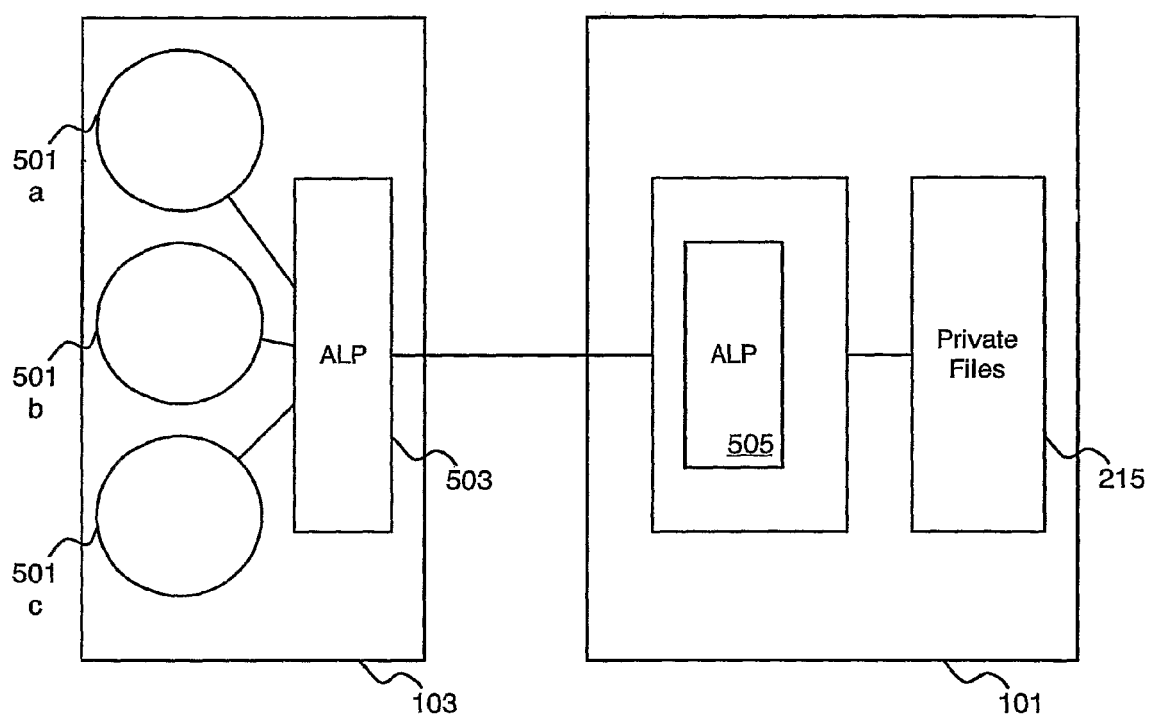
FIG. 5 is a block diagram illustrating an example application level structure for communication between a host computer and a smart card.

FIG. 5 is a block diagram illustrating an example application level structure for communication between a host computer 103 and a smart card 101. As discussed hereinabove and described in the co-pending patent application Ser. No. 11/564,121, the host agent 211 is stored in the NVM 205 and is loaded by the host computer 103 from the mass storage portion 221 of the smart card 101. Several application programs 501a-c execute on the host computer 103. As a person skilled in the art realizes, in reality this means that these programs are loaded into RAM on the host computer 103 and the instructions of these application programs 501 are causing the central processing unit 401 to perform certain tasks. If a program 501 is an application program that accesses data on the smart card 101, the program 501 sends communications messages via the host agent 211. The host agent 211 contains a host-side implementation of a communications protocol for performing application level communications, the application layer protocol (ALP) 503. Conversely, on the smart card 101 the card agent 213 contains a card-side implementation of the ALP 505.

As discussed hereinabove, the smart card 101 may contain a private area containing private files 215 that require adherence to particular security policies for access. The ALP provides for communication at an appropriate security level depending on the access the particular application 501 attempts.

It should be noted that while FIG. 5 illustrates the applications 501 executing on the host computer 103, in alternative uses of the communications systems and methods described herein, the applications 501 execute on remote computers connected to the smart card 101 over a network.

At a lower level the communication channel between the smart card 101 and the host computer 103 is the USB mass storage interface. The card agent 213 and the host agent 211 communicate through files. In one embodiment, the files for communication consist of two files, one for input and one for output. In another other embodiment, the communication uses one file. In other embodiments, the communication uses multiple files and a predefined protocol for selecting files.

Figure 6A:
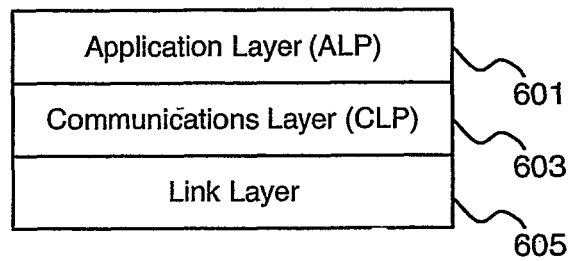
FIG. 6A-C are schematic illustrations of the communications protocol stack implemented by both the host agent and the card agent.

FIG. 6a is a general schematic illustration of the communications protocol stack implemented by both the host agent 211 and the card agent 213. The application layer 601, described in greater detail below, supports application dependent communication channels between applications 501 and the smart card 101. A communications layer protocol (CLP) 603 provides application independent communication between the host computer 103 and the smart card 101. The communications layer 603 also manages communication security such as key update, encryption and decryption.

Figure 6B:
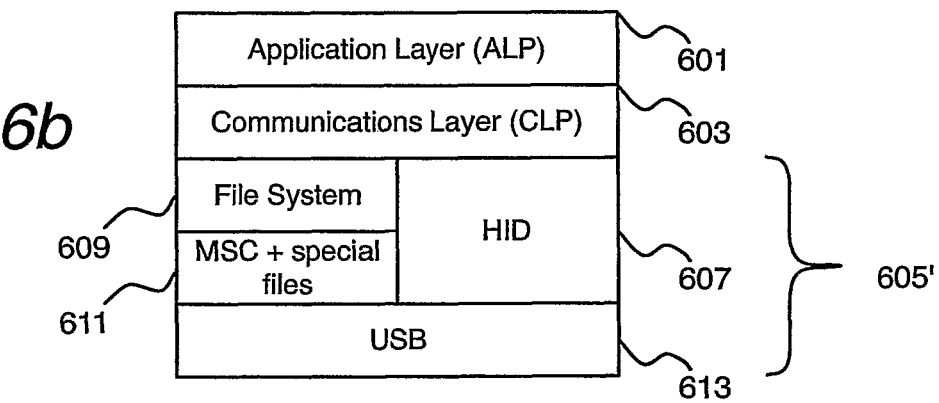

FIG. 6b is a schematic illustration of the communications protocol stack on the host computer 103 implementing the CLP. The host-side link layer 605' includes calls on the operating system, e.g., Windows file system 609, for access to files on the MSC volume of the smart card 101. Further the operating system provides a USB MSC driver 611. The CLP uses special files for communication with the smart card 101. Signaling is provided by the USB HID driver 607 provided by the operating system. Both the MSC and HID drivers interface with the USB protocol layer 613 and through it, the USB hardware.

Figure 6C:
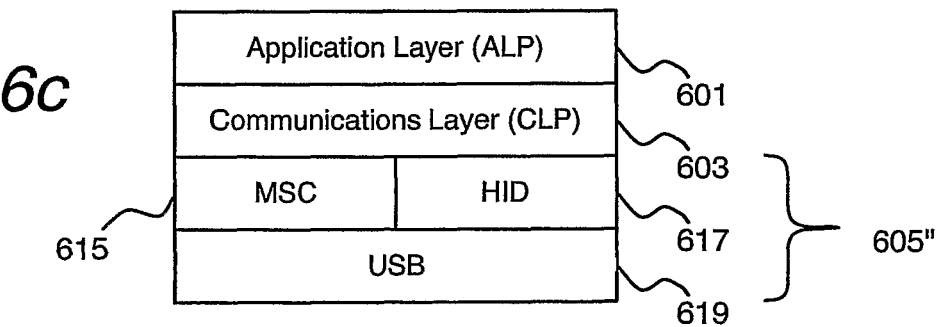

FIG. 6c is a schematic illustration of the communications protocol stack on the smart card 101 implementing the CLP. The card-side link layer 605" of the smart card 101 includes a USB MSC driver 615 to present the MSC volume of the smart card 101. Further, the smart card 101 protocol stack includes a USB HID driver, 617, to provide signaling to the host computer 103. Both the USB and HID drivers interface with the USB protocol layer 619 and through it, the USB hardware.

Figure 7:
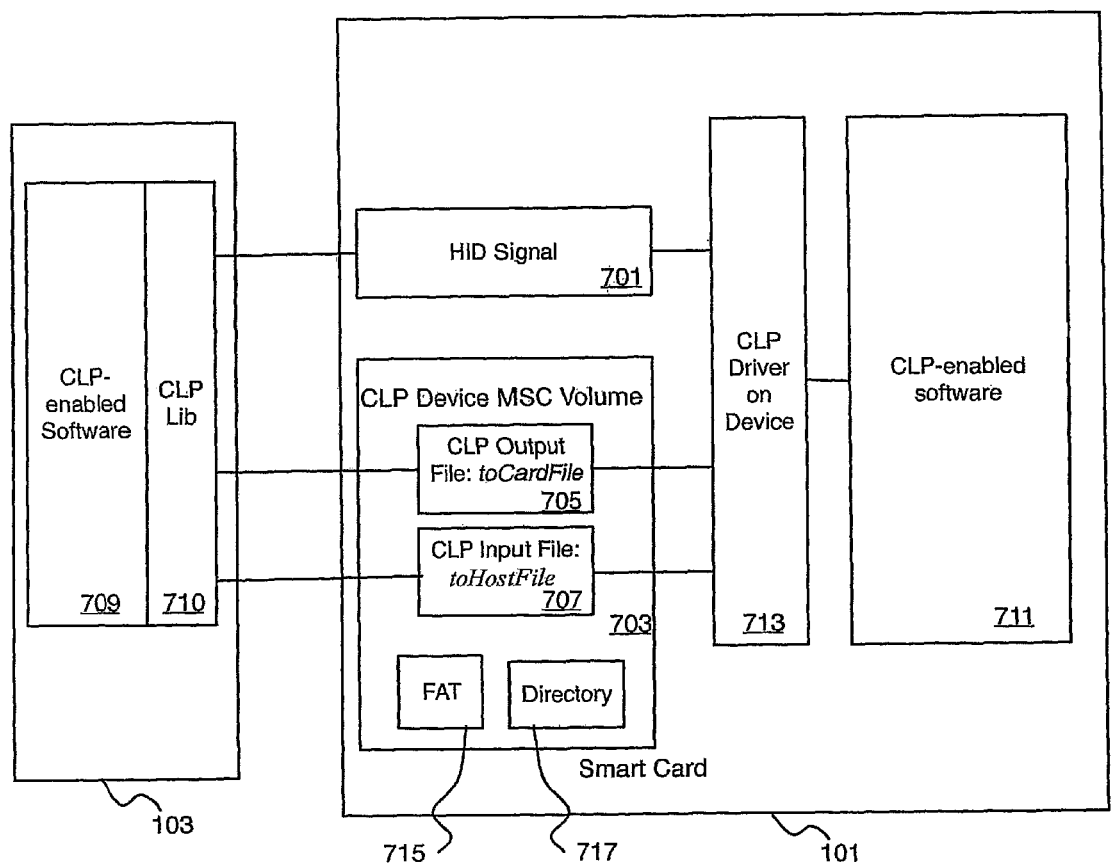
FIG. 7 is a high-level schematic illustrating this use of HID in conjunction with USB mass storage class drivers.

To provide signaling between the smart card 101 and the host computer 103, the host agent 211 and the card agent 213, through their respective communications layer protocol implementations make use of the USB human interface device (HID) class drivers. FIG. 7 is a high-level schematic illustrating this use of HID in conjunction with USB mass storage class drivers.

The only USB device drivers available, and that can potentially be used for two-way communications, on stock Windows 2000/XP computers are the Human Device Interface (HID) and the Mass Storage (MSC) devices class drivers. HID provides means for a low latency type communication that can behave on a peer-to-peer mode. For full-speed USB the drawback of HID is that its throughput is capped to 64 bytes per frame (64 kB/s on USB 1.1 devices). On the other hand MSC devices can reach the maximum throughput of the bus (1.2 MB/s on USB 1.1 devices), but have the lowest priority access on the bus and behave on a master/slave mode only.

The CLP combines an MSC device with an HID device to use the best of each:
 high throughput from MSC
 high responsiveness on a peer to peer-like communication mode from HID When the smart card 101 is initialized, such as during a power up on insertion into a USB port of the host computer 103 or after a reset, the card enumerates as both a USB HID device 701 and as a USB MSC device 703. The USB MSC device presents two data files 705 and 707, respectively, one for output from the host computer 103 to the smart card 101, a CLP output file 705, and one for input to the host computer 103 from the smart card 101, a CLP input file 707.

On the host computer 103 side of the communication, a CLP enabled program is required 709. In a preferred embodiment, the CLP enabled program 709 is the host agent 211. However, the CLP enabled program 709 may be a pre-installed program on the host computer 103 rather than one that is loaded from the smart card 101 as is the host agent 211. The CLP enabled program 709 uses the CLP library 710 for communications, which requires no privilege. The CLP library 710 accesses two files on the MSC volume presented by the CLP-enabled device, and responds to the HID signals sent by the same device. On the smart card 101 side, CLP-enabled software 711 communicates through a dedicated CLP driver 713 hooked on modified MSC 703 and HID device drivers 701.

To send data to the smart card 101, the CLP-enabled software calls upon the CLP library 710, which writes in the CLP output file 705 using the standard windows file system calls. The modified MSC driver on the smart card 101 intercepts the low level write request from the host computer 103 and relays the data written to the CLP layers, which in turn dispatches the data written to the software 711 on the smart card 101.

To receive data from the smart card 101, the CLP library 710 waits for the reception of an HID signal from the smart card 101. This wait operation has no cost since it is managed by the USB hardware and the host computer 103 can perform other tasks during this time. This is one purpose of the HID device portion of the CLP, namely avoiding the polling on the CLP input file 707 for data that would involve an endless repetition of windows file system calls which would have a noticeable negative effect on the responsiveness of the host computer 103.

Figure 8:
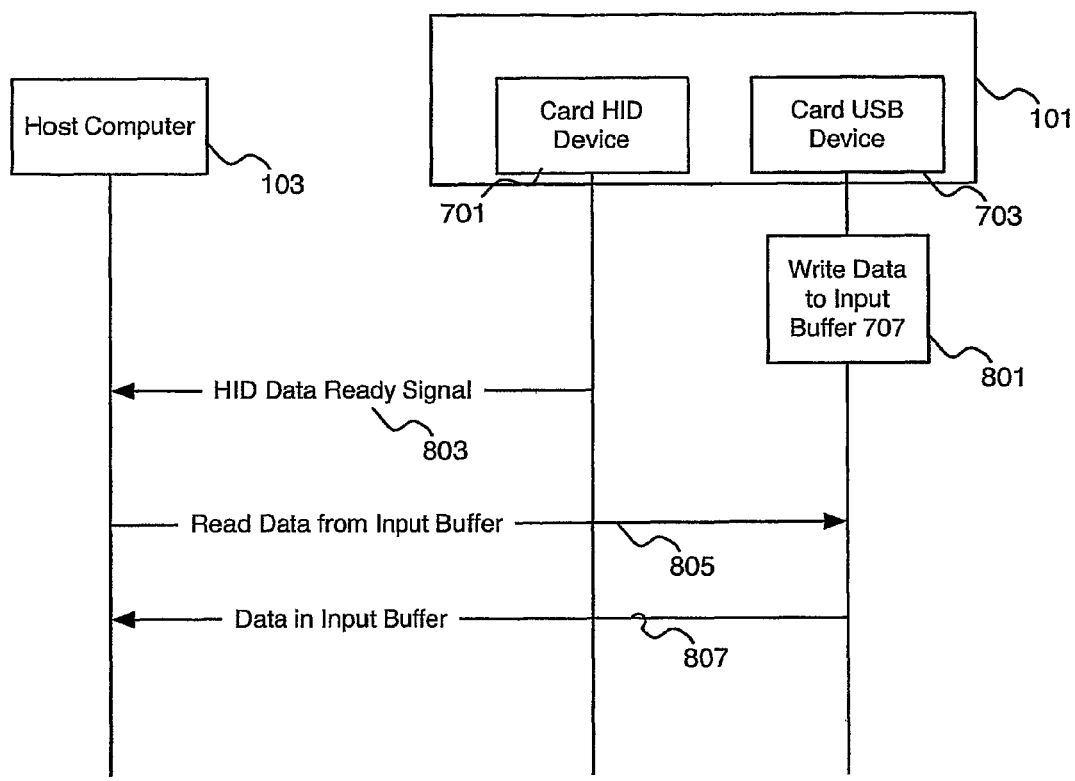
FIG. 8 is a timing sequence diagram illustrating the data flow and events that occur in transmitting data from the smart card to the host computer.

FIG. 8 is a timing sequence diagram illustrating the data flow and events that occur in transmitting data from the smart card 101 to the host computer 103.

HID devices communicate with the host computer through reports. Reports are packets of data that are formatted according to a report descriptor. Report descriptors are provided to the host computer 103 by the HID device as part of the initialization process. There are three types of reports:

The feature report is used to set or get some device configuration values. This type of report is read from or written to the device at the initiative of the host, on the default control pipe. That makes the feature report unsuitable for signaling.

The in report is used to get device information as they come, for example a mouse move. This type of report uses an IN interrupt USB endpoint, which means that the USB host controller operates a hardware polling on the bus, at a 1 ms rate, and the device sends its report on the next polling it has a ready report. The USB hardware polling is done at no cost, and entirely by the hardware controller, so the host computer suffers no overhead from it.

The out report has a similar use to the in report, but sends data from the host to the device instead. It is of no particular relevance herein.

Signaling is used by the smart card 101 when the smart card 101 desires to transmit data to the host computer 103. Signaling using BID is useful because that technique offers a way around the master-slave relationship between the smart card 101 mass storage device and the host computer 103. By the smart card 101 signaling to the host computer 103 when the smart card 101 has data to send, the host computer 103 can read the CLP input file 707 (the toHostFile) only when appropriate, saving costly use of resources.

In a preferred embodiment, a callback is registered on a signal. Unfortunately, a callback mechanism is not available in the Windows HID API. However, the API provides a handle to the device, and allows the host computer 103 to make blocking read calls on this handle.

To send data to the host computer 103, the smart card 101 first writes the data in the input file internal buffer, step 801, and then the smart card 101 sends, on the smart card 101 HID device 701, an HID in report signal to the host computer 103 indicating that there is data ready in the input buffer 707, message 803. The host computer 103 reads the in report from the HID handle associated with the smart card 101 HID device 701. The call to read the in report is blocking. Upon reception of the HID In report signal 803, CLP-enabled software 709 on the host computer 103 reads the data input via the CLP library 710, which reads the CLP input file toHostFile 707 by issuing the appropriate USB mass storage read command 805 to request transfer of the data from the input buffer to the host computer 103, message 805. The smart card 101 USB device 703 responds with transmitting the data, message 807. The call to read data from the toHostFile is non-blocking.

Thus, the USB HID protocol is used in conjunction with the USB MSC protocol in the CLP implementations on the host computer 103 and in the smart card 101 to cooperate to transmit data from the smart card 101 to the host computer 103.

When the smart card 101 initializes, it enumerates as a USB MSC device (and as a USB HID device). The smart card 101 presents an MSC volume having two files; the CLP output file 705 and the CLP input file 707. There is no hard requirement on the file system that should be present on the MSC volume. There is however an implementation requirement that the device must be able to trace the logical block address-file association for the CLP IO files at any time.

The above implementation requirement translates into:
1) the CLP IO files must have fixed logical bloc address, or
2) the CLP device must be able to interpret the file system and the file system structures must not be cached by the host.

In a preferred embodiment, the MSC volume follows the FAT16 format (without long name support, if the FAT is to be managed by the device) with one input file 707 and one output file 705.

In another embodiment, the CLP uses one file for communication. In other embodiments, the communication uses multiple files and a predefined protocol for initializing and selecting files.

When the smart card 101 initializes, it also enumerates as a USB BD device. The CLP device uses a minimal HID device to signal the host when the host computer 103 should read the CLP input file 707.

The HID device features an IN report of 2 bytes. This report holds the total size of the upcoming CLP frame to be transmitted over the MSC volume 703, coded on a little-endian half word (2 bytes).

There is no requirement on the report presentation or declaration.

There is also no requirement on the vendor and product IDs of the USB device. The CLP host library provides means to adapt to different products (or vendors).

The CLP HID device will be identified by its (vendor ID product ID) couple, so that upon initialization, the CLP host library must be provided the correct couple to enable communication with the right device.

In a preferred embodiment, several constraints are followed to optimize the utility of the mechanisms described herein.

From the CLP IO files, the following constraints appear:
Cached Read or write access to these files must be disabled (see implementation notes for guidelines).
The CLP IO files size must be equal to the reported device block size. We will further determine this block size is 512 bytes.
The CLP files must not be moved on the volume (from a logical block address point of view).
No file named like the CLP IO files must be on the other drives root directory (if the CLP device is to be used in a context different from autorun).

From the CLP HID device, the following constraint appears:
Two sample of the same HID product (identified by its (vendor ID, product ID) couple) cannot be used at the same time on the same host.

If two CLP devices are to be plugged to the same host at the same time, they must:
1) Have different (vendor ID, product ID) couple (HID requirement)
2) Be both used in autorun context (CLP IO Files requirement)

In a preferred embodiment there are three types of CLP requests:
File write request (host triggers; given the file size, it is processed in one MSC request)
File read request (host triggers; given the file size, it is processed in one MSC request)
HID signal request (device triggers).

Similarly, there are two CLP states:
Ready when no operation is being done on the file
Reading, when the device is waiting for the host to read a prepared CLP input file.

The behavior of the system is a function of request and state as illustrated in Table 1:

TABLE 1

Behavior of device depending on request and state.

| | | Next State |
|---|---|---|
| CLP is Ready state | | |
| Write | Data is written to the CLP device | Ready |
| Read | CLP ignores; Data is read from fallback file[1] | Ready |
| HID | CLP goes to Reading state | Reading |
| CLP is in Reading state | | |
| Write | CLP ignores; Data is written to fallback file, or ignored[1] | Reading |
| Read | Data is read from the CLP device | Ready |
| HID | CLP ignores | Reading |

[1]The actual behavior of the device when the CLP transport sub layer ignores the request depends on the underlying implementation. For example, if the MSC volume is located on an external flash chip, the flash block at the address of the CLP IO file might be accessed. If the MSC volume is virtual (only exit on request basis), write might be fully ignored, and read might send standard or randomized data.

The size information sent within the HID signal is informative. In any case, the authoritative size information is located in the CLP frame header.

In a preferred embodiment, accesses on the CLP IO Files should be of size 512.
Reading less could lead to receiving an incomplete CLP frame.
Reading more should not be permitted by the file system, and would append unpredictable data after the CLP frame.
Writing more will have unpredictable effects (from nothing at best to completely disable the CLP capabilities at worst.
Writing less could lead to sending an incomplete CLP frame.

Figure 9:
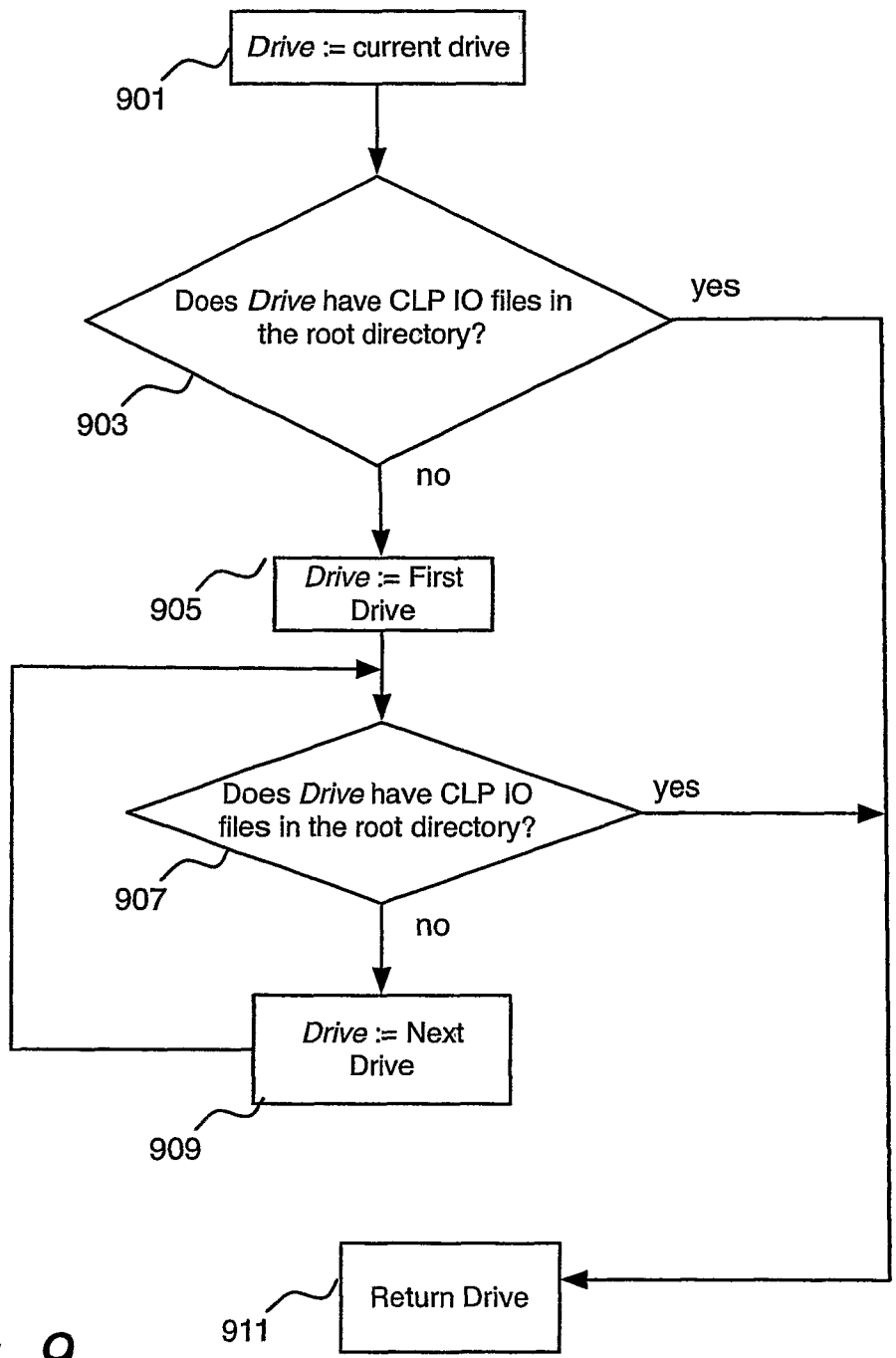
FIG. 9 is a flow-chart illustrating a method for finding the drive letter for the device volume.

Because the operating system of the host computer 103 may not have a mechanism for retrieving an association between a logical drive and a physical drive without having some administrative privileges, the drive letter mapped to the CLP MSC device 703 may not be found from the MSC device 703 intrinsic information. FIG. 9 is a flow-chart illustrating a method for finding the drive letter for the device volume:
1. Test the current drive (drive from which the software is executed), steps 901 and 903, for the presence of both the CLP IO files in the root directory, step 903. This case will cover the use case of a device with autorun software.
2. Test all the drives in the system for the presence of both the CLP IO files in the root directory and stop at first hit, steps 905, 907, 909.
3. Return the drive letter for the drive that has the CLP IO files.

Implicit is that some form of error message would issue if no drive with the CLP IO files is found.

In one embodiment special host-side file handling may be employed. The following discussion describes the embodiment in the context of the Windows operating system.

To achieve better interactive performance, the Windows file system by default enables caching. When an application writes data to a file, the file system writes the data to a file cache. The file system writes the data in the cache to the disk when the cache is full, when the application forces a write to disk, or according to other criteria such as time. When an application reads data from a file, the file system reads the file from the cache if the file is there; if not, the file system reads data from the disk. File system caching is useful for normal file system usage. However, caching presents problems for using files as a communication tool as described herein. When the host agent 211 writes to the CLP output file 705, the file system may cache data instead of writing the data to the disk, in this case to the MSC Volume 703. If the data is cached, the smart card 101 does not see the data until some time later and would be unaware of the attempted communication. Similarly for the data written by the card, the host agent may read old data from the file system cache. To solve these problems, in one embodiment, the host agent 211 turns off the file system cache.

Even with the file system caching disabled, Windows uses internal buffers and performs data integrity checks when a file is written and then read back. This behavior prevents to use only one file for the FileIO channel, because it is very unlikely that what the host computer 103 reads from the smart card 101 CLP IO files is exactly what was previously written to the smart card 101 CLP IO files. Windows would interpret this data mismatch as a write failure.

Moreover, the FileIO files must not only exist, but also be bigger than a block, because Windows trims the read calls to at most the file size, if the host computer 103 attempts to read 30 bytes and the file size is 20 bytes, only 20 bytes would be retrieved, even though a 512-bytes block from the card was retrieved by the read operation.

Accordingly, the host agent 211 turns off file system caching of the CLP IO files 705 and 707. To open the files, the host agent 211 issues a Windows API CreateFile function call. To turn off file system caching, the function arguments include the flag FILE_FLAG_NO_BUFFERING. Working with files that have buffering turned off requires special precautions. These are described in (http://msdn2.microsoft.com/en-us/ library/aa363858.aspx), the entire disclosure of which is incorporated herein by reference.

In an alternative embodiment, instead of using HID to signal, the smart card 101 manages the state of USB bulk IN endpoint used for mass storage device. The USB endpoints exist at the terminus of the USB communication channel. When a USB device desires to transmit data, the device places the data in the IN endpoint of the device. The host computer then reads that endpoint by sending an IN packet to the endpoint requesting the data. The smart card 101 uses the IN endpoint to signal by causing the IN endpoint to answer an IN packet with a NAK while a read request for the input file is active and data is not yet available for transfer. Although this results in more unproductive USB traffic on the bulk pipe, this traffic involves only the host controller and the USB serial engine on the card. This is an accepted USB behavior for bulk traffic. No general CPU overhead on either the host computer 103 or the smart card 101 is required. The smart card 101 can allow the transfer to continue as soon as data availability conditions are met.

To support the usage of USB Mass Storage files for I/O, the smart card 101 manages a file access table (FAT) 715 and a file directory table 717. Upon initialization of the smart card 101, the host file system reads the file directory 717 on the mass storage device 703 of the smart card 101 once when the host computer 103 loads the smart card 101 mass storage volume and, conversely, the host computer 103 writes the file directory 717 once when the host computer 103 closes the files.

The card side FAT 715 is at least partially protected to prevent modification of the CLP IO files 705 and 707, respectively. Moreover, accesses to these files are intercepted and routed to the CLP buffers; while the CLP IO files appear as physical files to the host computer 103, on the smart card 101 the CLP IO files are virtual files that are implemented as data buffers. Though these files appear in the FAT 715, the files do not actually have physical existence in the non-volatile memory of the mass storage.

In one embodiment the FAT 715 is a hard-coded FAT in the smart card 101 with interception of write accesses made to the FAT 715 or a dynamically generated FAT.

Hereinabove the communication using USB mass storage protocol has been described using two files, the CLP Output File: toCardFile 705 and the CLP Input File: toHostFile 707. In one alternative embodiment a single file is used for communication in both directions. In another alternative embodiment, multiple files are used.

The following scenario, provided as an example, illustrates the alternative embodiment using multiple files for the communication:

H—Host writes a request to file A(n).
C—Mass Storage and FAT emulation processing of the write-file request.
C—Event is triggered by USB Mass Storage or FAT emulation layer, on reception of request data.
H—Host polls on file B(n) for read file B(n) (or may be on file C(n) to read on file B(n), because the need to detect a sure change in the file)
C—Card makes internal processing on this data.
C—Card makes result available in a buffer for the host to read it through IO file,
C—Card selects a random new IO file set (A(n+1), B(n+1), and C(n+1))
C—Card enqueues this file set information to the send buffer, or places the file in a separate buffer, to be read via file C(n)
C—Card makes some change on the output file (host file B(n)) or in a dedicated even file (host file C(n))

H—Host detects change notification, and read the response from the card in file B(n). At the same time, the card receives the new IO file set
C—On completion of the read-file request, the card effectively switches to the new IO file set: n:=n+1=> and loop on this sequence Application Layer Protocol As described hereinabove in conjunction with FIG. 6, in an embodiment of the invention the communications stack for host-card communications includes an application layer protocol that supports application dependent communication between the host computer 103 and the smart card 101.

The Application Layer Protocol (ALP) provides for multiple types of application level communication. The different types may be used depending on the attempted operation on the smart card 101. For example, different types of operations require different security policies.

The following example is a list of three APL types used in one embodiment of the invention:
ALP Type 0x01, APDU 7816-4 to encapsulate APDUs.
ALP Type 0x02, Emulated mass storage commands, to administrate the mass storage partition.
ALP Type 0x03, Administrative commands.

ALP type 1 is used to transport APDUs to the main operating system of the smart card 101 over a mass storage unit, and is the main communication channel between a user-mode application on the host computer 103 and the smart card 101 OS.

ALP type 2 purpose is to administrate mass-storage volumes that are implemented using an emulation of traditional file systems, rather than a complete mass storage implementation (such can be the case for space constrained products).

ALP type 3 is also an APDU transportation protocol intended for administrative purposes, i.e., ones that require a higher level of security or privilege. The security mechanism of ALP type 3 includes a PKI infrastructure that enables a higher degree of trust.

ALP Type 1: APDU Transport Protocol

The application layer protocol type 1 uses the ISO 7816-4 APDU in order to reuse most of the existing card side operating system. High-level APDUs are transported over the communication layer protocol.

ISO 7816-4 ALP Message Exchange

With ISO 7816-4, the host computer 103 acts as a master that issues requests; the smart card 101 acts as a slave that fulfills the host's requests and sends back responses.

APDU Command Exchange

Figure 10:
FIG. 10 illustrates the protocol-specified four cases using CMD_PROCESS requests.
Figure 10:
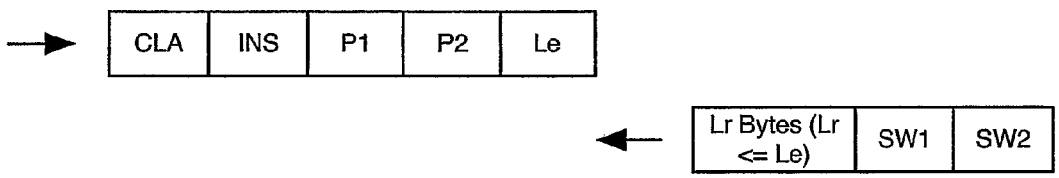
Figure 10:
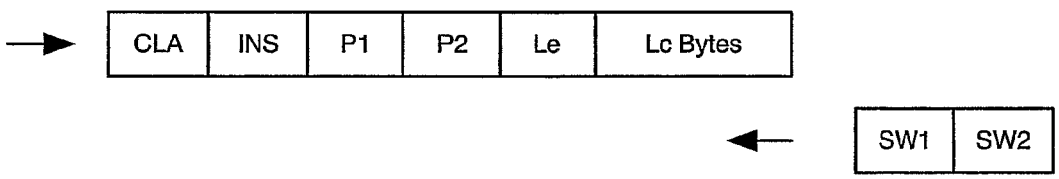
Figure 10:
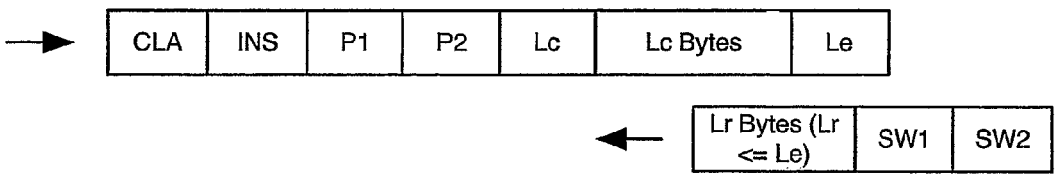

FIG. 10 illustrates the protocol-specified four cases using CMD_PROCESS requests. Diagram 151 illustrates Case 1: Command without data transfer. Diagram 153 illustrates Case 2: Command with data transfer from card to host. Diagram 155 illustrates Case 3: Command with data transfer from host to card. Diagram 157 illustrates Case 4: Command with bi-directional data transfer.

The field definitions are as follows:
CLA=is class byte
INS=instruction byte
P1, P2=parameter bytes
SW1,SW2=Status bytes
Le=Length of Expected Data
Lc=The number of bytes present in the data field of the command APDU
Lr=The number of bytes present in the data field of the response APDU is denoted by
Lr. Lr can be identified from the two bytes of the ALP Header Data length field in CLP payload.

With the host agent 211 and card agent 213 architecture, normal message exchanges follow the pattern illustrated in FIG. 10. The host agent 211 sends a request, typically with data, to the smart card 101 and expects a response back from the smart card 101. With 1024 bits encryption, all encrypted messages are shorter than 256 bytes. With 2048 bits encryption, all encrypted messages are shorter than 500 bytes. Therefore, a 512 bytes transmission block is sufficient for every encrypted message to be sent between the host agent 211 and card agent 213.

Since the transferred size is fixed to 512 bytes, in one embodiment, to optimize data transfer speed each APDU pair is transmitted in two blocks, one for the host to card transfer, one for the card to host transfer. The APDU payload is transferred in the ALP payload part of the CLP packet. To sum up, for case 4 (every other case can be deduced), the ALP is encapsulated into:

APDU Command Part

| 7 bits | 9 bits | 5 bytes | Lc bytes | 1 byte |
|---|---|---|---|---|
| ALP type 0x01 | ALP Length (Lc + 6) | CLA\|INS\|P1\|P2\|Lc | APDU Data | Le |

APDU Response Part

| 7 bits | 9 bits | Lr bytes | 2 bytes |
|---|---|---|---|
| ALP type 0x01 | ALP Length (Lr + 2) | APDU Response Data | SW1 \| SW2 |

ATR Message

The ATR Response Data is the first ALP payload sent by the smart card 101 after an ALP_IF_UP CLP command on the ALP interface type 0x01. The ATR Response Data is encapsulated as follows:

| 7 bits | 9 bits | X bytes |
|---|---|---|
| ALP type 0x01 | ATR Length | ATR Message (inc. 0x3B) |

Long Messages

Normal message exchanges between the application layers of the host agent 211 and the card agent 213 require one CLP packet for each message. The CLP packet could contain up to two APDUs.

Some specific card functionality (for instance certificate verification and host agent patching) requires messages longer than the maximum APDU size. In that case, a few techniques can be used case by case to override this limit:
- Chain APDUs at the applicative level (e.g. for the certificate)
- Chain some specific CLP commands over multiple CLP packets (e.g. for the host agent patching)
- The ALP encapsulation will be able to support extended APDUs up to 512 bytes.

CLP Restrictions

Due to the command/response nature of APDUs, only one ALP packet of type 0x01 is included in a single CLP payload.

ALP Type 2: Volume Management Protocol

For some smart card applications, a read-only mass storage volume is presented to the host computer for various purposes. However, for cost constraints, in one embodiment only on-chip non-volatile memory is used for storage. This results in the availability of very limited space. To avoid wasting space on a PC-type file system an emulated FAT layer is used to present a host computer a valid FAT16 volume from minimal data structures stored in the smart card 101. Such a volume cannot be modified directly by the host computer 103.

The ALP type 2, also called the Volume Management Protocol, permits the modification of emulated FAT internal structures.

Volume management is used at device initialization and for file patching.

Command Set

The volume management protocol, ALP Type 2, defines a set of commands used to update the emulated FAT volume. Table 2 is a list of these commands and their respective purposes:

TABLE 2

Volume Management Commands

| Type | Command | Description |
|---|---|---|
| 1 | INIT_UPDATE_SESSION | Initialize an update session.. |
| 2 | GET_VERSION_DATA | Returns list of file versions |
| 3 | SET_DISK_SIGNATURE | Set the volume signature |
| 4 | NEW_FILE | Creates a new file of specified length. |
| 5 | DELETE_FILE | Deletes specified file |
| 6 | UPDATE_FILE | Update the content and the size of an existing file |
| 7 | WRITE_FILE | Load a chunk of previously created/updated file |
| 8 | COMPACT_FILES | Compacts the Mass Storage partition. |
| 9 | END_FILE_SESSION | Closes a file write session, updates the version |
| 10 | END_SESSION | Closes an update session |
| 11 | SET_THUMB_REF | Set the thumbprint reference values in binary |
| 12 | SET_INITIAL_KEY | Write the initial key reference in binary |

All VMP commands return a status, and no new command is accepted until the status of the previous one has been read by the issuer. A command rejected for this reason does not issue a status.

Session Management

In order to protect the integrity of the product, volume updates are only allowed within encrypted and authenticated sessions. Within these so-called "Patch sessions", "File sessions" can be nested when file data is written.

Figure 11:
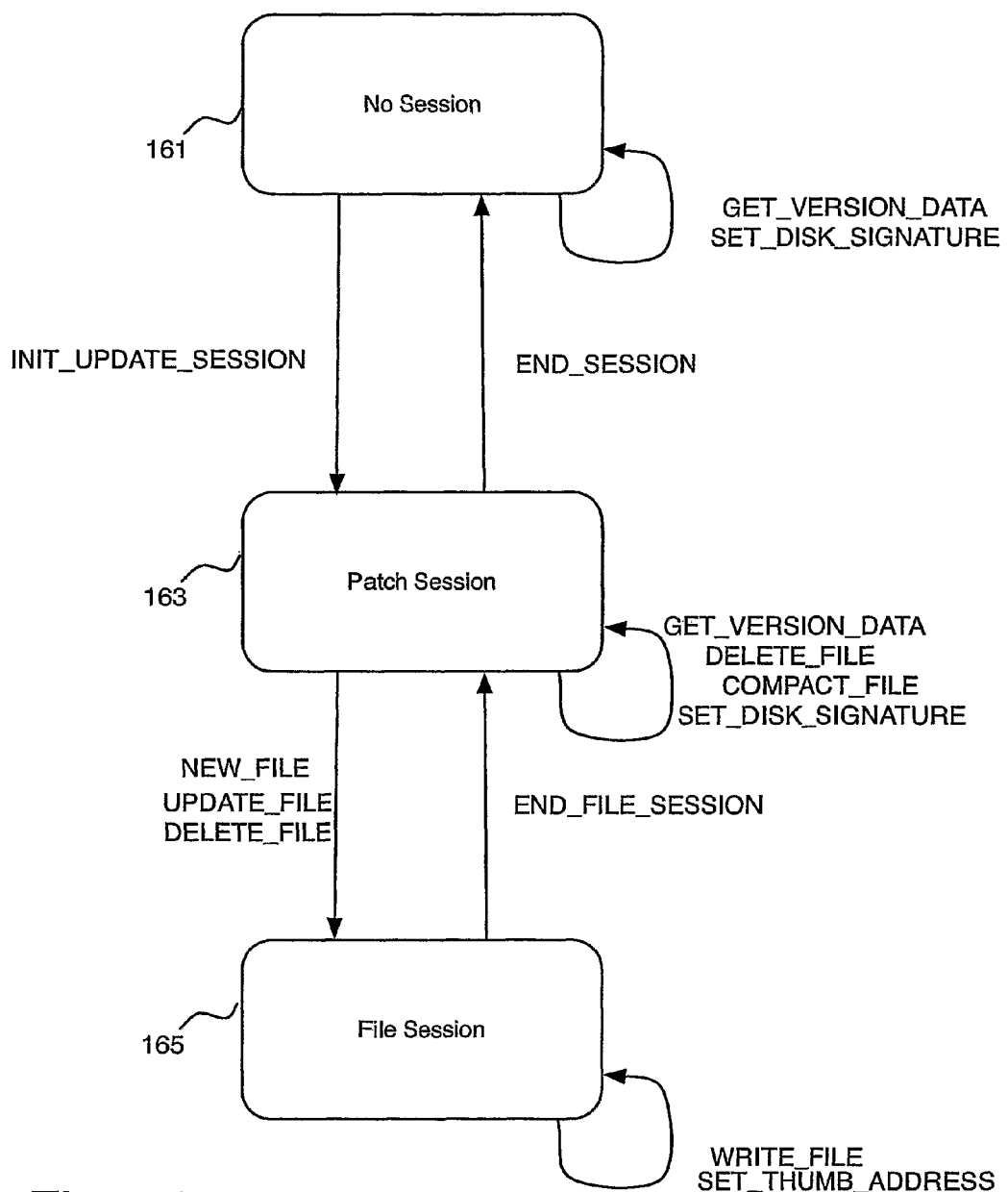
FIG. 11 is a state diagram illustrating the various command availability depending on the session state and the state transitions that follow from the execution of the particular commands.

FIG. 11 is a state diagram illustrating the various command availability depending on the session state and the state transitions that follow from the execution of the particular commands.

As illustrated by the graph, the GET_VERSION_DATA and INIT_UPDATE_SESSION commands are the only commands that are allowed to proceed without being in an encrypted session. All other commands are rejected if initiated out-side of an encrypted session.

The session state is a volatile data, after a reset, the session state is reset to "No Session", state 161.

Behavior Towards CLP

The ALP type 2 frames are not encrypted at the CLP level. (Encrypted bit of the ALP header is left to 0).

To avoid inconsistency of host agent software residing on a being modified volume, and to increase reliability and security of the patching mechanism, the VMP disable all other type of ALP communication on the CLP link when a patch session is opened.

The other types of ALP are enabled when a patch session is closed.

This is a non-volatile state, if a reset occurs in the middle of a patch session, all other channels are still disabled after the reset, even if the session has been reset to "No Session". It is then necessary to complete a new patch session to recover the device.

For every command that permits, the ALP header size is compared with the command expected size. A case of mismatch leads to an incorrect parameter error type.

Behavior Towards Host PC

When a volume is being updated, it is not expected that the host computer 103 file system reflects the modifications immediately. A re-enumeration of the mass storage device may be needed to inform the host computer 103 file system of modifications to data files on the smart card 101.

Session Protection

The GET_VERSION_DATA is a public, unencrypted command enabling easy retrieval of the MS partition info for patch generation.

The SET_DISK_SIGNATURE is a public, unencrypted command enabling easy customization of the partition signature. This is not critical information, but might be needed for the customization process.

INIT_UPDATE_SESSION has a specific format that enables exchanging initial session values (shared key and counter IV) using a PKI scheme.

All other commands are protected by a SHA-1 MAC and a session counter that is incremented from command to command. All the command data, the counter and the SHA-1 MAC bloc is encrypted using the shared TDES key generated during the session initiation.

The card rejects out of order commands.

| 1 byte | 4 bytes | X bytes | 20 bytes |
|---|---|---|---|
| Command Clear text | Counter | Command data Encryption with TDES key | MAC |

The MAC is computed from the type byte (included) to the end of the command data, with SHA-1

All the fields from counter (included) to MAC (included) are encrypted using the shared TDES key generated by INIT_UPDATE_SESSION (KR_ALP1_SESSION_KEY).

The counter field is incremented by one from one command to the next, the initial value being provided in INIT_UPDATE_SESSION.

The response to these protected commands are also protected with the same mechanisms

| 1 byte | 4 bytes | X bytes | 2 bytes | 20 bytes |
|---|---|---|---|---|
| Command Clear text | Counter | Response data Encryption with TDES key | Status Word | MAC |

The MAC is computed from the type byte (included) to the end of the response data, with SHA-1

All the fields from counter (included) to MAC (included) are encrypted using the shared TDES key generated by INIT_UPDATE_SESSION (KR_ALP1_SESSION_KEY).

The counter field is the counter value included in the command that is answered.

INIT_UPDATE_SESSION

The INIT_UPDATE_SESSION command initializes a secure update session by transmitting a shared secret symmetric key and a random counter between the source and the destination. The command is signed and encrypted using a PKI scheme to ensure transmission safety.

INIT_UPDATE_SESSION (command type 0x01) has the following format:

| 1 byte | 128 bytes | 128 + 4 + 1 + 1 + 4 = 138 bytes |
|---|---|---|
| 0x01 | $\{Skey\}_{dest\_pub\_key}$ | { SIG (Skey\|Counter\|LUN\|RP\|version)$_{source\_priv\_key}$\|Counter\|LUN\|RP\|version}$_{Skey}$ |

The Counter (4 bytes) is generated by the source. The counter is incremented for each of the subsequent messages.

LUN (1 byte) is the logical unit number (of the mass storage device) of the target device.

RP is the ID (1 byte) of the file collection to be patched (a collection can range from one file to all files).

Version (4 bytes) is the new version number for this file collection. See IR6 for versioning mechanism.

The shared session key (KR_ALP1_SESSION_KEY) and the counter initial value are randomly generated by the source[2]. The shared key is a 3DES key of 24 bytes long. The counter is 4 bytes long.

[2] Note that depending on the patch model chosen, the source can be either the card or the patch server (and the destination likewise).

Figure 12:
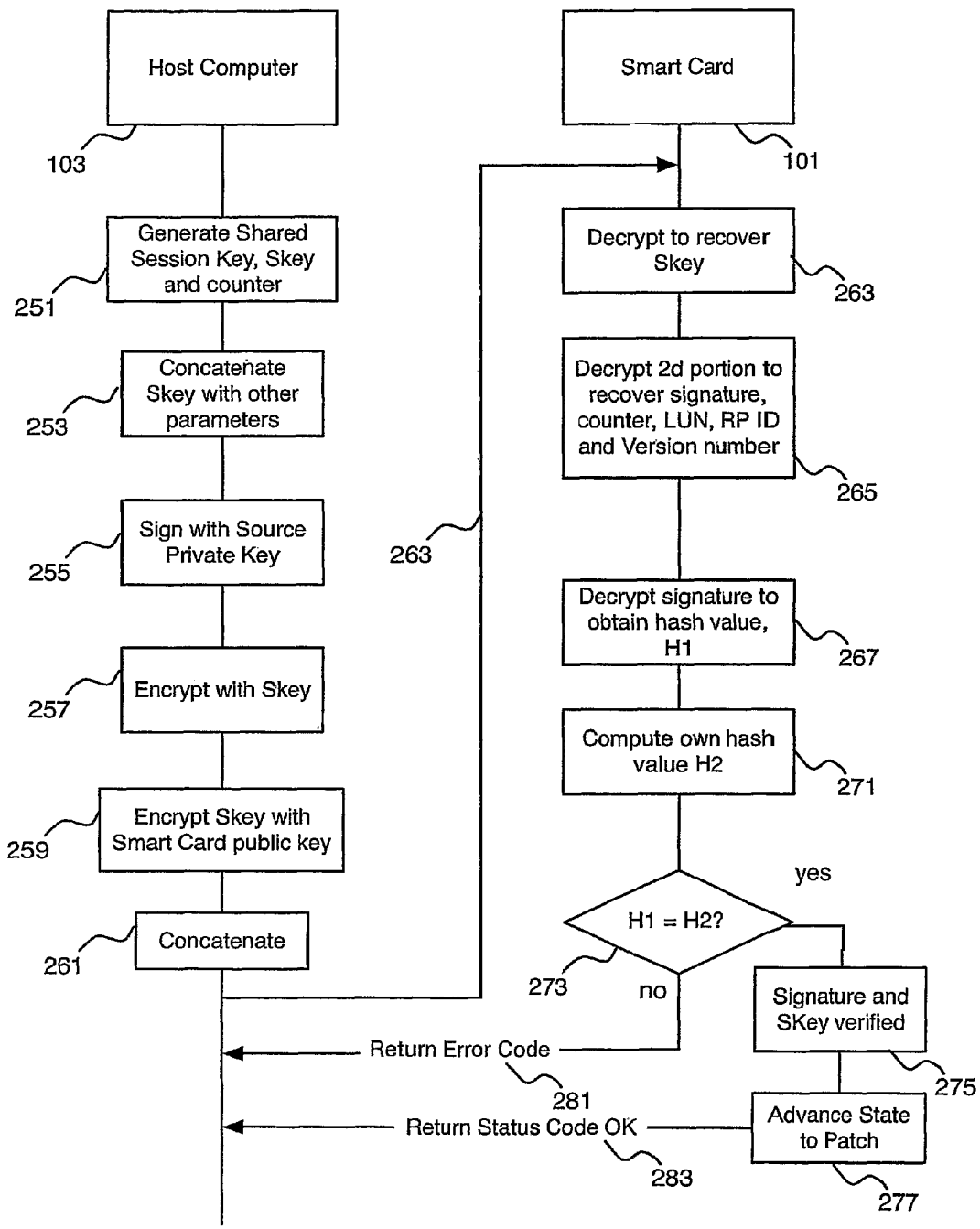
FIG. 12 is a timing-sequence diagram illustrating the creation and processing of the INIT_UPDATE_SESSION command.

FIG. 12 is a timing-sequence diagram illustrating the creation and processing of the INIT_UPDATE_SESSION command.

The first byte is the command type identifier, e.g., from Table 2, 0x01, INIT_UPDATE_SESSION. Note, this byte is not encrypted. The source, i.e., host computer 103 or a remote server communicating with the smart card 101, generates a random shared session key for 3DES (24 bytes long) and initial counter value, step 251. These values are then concatenated with the other parameter values, e.g., LUN, RP ID, and Version number, step 253. The host computer 103 signs the list of values {shared key, counter, LUN, RP ID, version number} with its private key, step 255. The signing operation is applied on the hash (SHA-1) of the list. Thus, by signing the list of values, the host computer 103 can be verified as the source of the INIT_UPDATE_SESSION.

The host computer 103 then encrypts the signature, the counter, LUN, RP ID, and the version using 3DES and the shared key, resulting in an encrypted data blob, step 257. The server next encrypts the shared key using the card's RSA public key, step 259. The encrypted key and the encrypted data blob are concatenated (see above), step 261, and sent using the INIT_UPDATE_SESSION command, message 263.

The smart card 101, on receiving the command, first decrypts the first part using its private key to get the shared session key (Skey) via RSA, step 263. The smart card 101 then decrypts the second part using the shared key, via 3DES, to get the signature, counter, LUN, RP ID and version number, step 265. The card decrypts the signature using the server's public key to get the hash value H1, step 267.

Next the smart card 101 further computes its own hash value H2 using the shared key, the counter, LUN, RP ID, and the version number, step 269. If H1=H2, step 273, the card has validated the signature and the shared key, step 271. Once verified, the card keeps the shared key and the counter, step 273, and advances to the Patch Session state 163, step 275. If the verification, step 273, fails, an error status is returned, message 281, otherwise, a status OK is returned, message 283.

The answer to the INIT_UPDATE_SESSION command has the following format:

| 1 byte | 2 bytes |
|---|---|
| 0x01 | Status |

Status Code

| Status | Specific description |
|---|---|
| Code 1 | Successfully completed |
| Code 2 | Command not allowed under the current session state (possibly because VMP is locked) |
| Code 3 | Security Status Not Satisfied |
| Code 4 | Incorrect Parameters: Invalid LUN, RP or version is lower than the current version (or ALP header size mismatch) |

Patch Session

The following conditions apply on the patch session:
On a successful INIT_UPDATE_SESSION, the smart card 101 enters patch mode 163, and disables all other ALP types until a successful END_SESSION.
If the INIT_UPDATE_SESSION fails once, the smart card 101 disables the ALP type 0x02 until the next reset to prevent DOS attack.
If the END_SESSION is missing, or if the smart card 101 is reset before the end of the patch, the smart card 101 stays in patch mode (all other ALPs disabled).
The host agent 211, if available, should detect the patch mode lock so that it can redirect the user to a recover page.
If during a patch session 163 a NEW_FILE, UPDATE_FILE, or DELETE_FILE command is transmitted by the host computer 103 to the smart card 101, a File Session 165 is entered.
The following conditions apply on the file session:
A file session is opened by any one of the file commands NEW, DELETE and UPDATE, even if no data stage is needed (e.g. for DELETE).
A version coherency check is performed by the smart card 101 on the file session opening. If the specified version is equal or lower than the stored file version, the session opening fails. All following commands until next END_FILE_SESSION command fail but still need to be transmitted if the command counter coherency must be kept.
A NEW, DELETE or UPDATE command fail if a previous file session was opened and not closed with an END_FILE_SESSION.
The file version is 0 till the END_FILE_SESSION command successfully executes. This enables one way of detecting tearing conditions (for both the card and host agent).
ALP Type 3: Administrative Commands Transport Protocol
ALP Type 0x03 commands are used to send administrative commands to the card. Admin commands are APDU based, but are protected by a mechanism similar to the one from the ALP type 0x02 (i.e., anti-replay counter, shared symmetric session key, etc.).

Available administrative commands are specified in part ISO-7816-4 APDU specifications.

Command Specification

In one embodiment, the following commands for ALP type 0x03 are supported:

| Type | Command | Description |
|---|---|---|
| 1 | INIT_ADMIN_SESSION | Initializes an admin session. |
| 2 | APDU_MESSAGE | Encapsulates an APDU command/response |
| 3 | END_ADMIN_SESSION | Ends an admin session |

INIT_ADMIN_SESSION

INIT_ADMIN_SESSION has the same format has INIT_UPDATE_SESSION and uses the same keys. The INIT_ADMIN_SESSION also has the same return status and failure conditions.

The only differences with respect to the INIT_UPDATE_SESSION are the following:
If executed successfully, the smart card 101 is locks other ALP types (eg type 0x01 and 0x02), until the next smart card 101 reset or END_ADMIN_SESSION.
If executed successfully, every subsequent APDUs executed through APDU_MESSAGE command till END_ADMIN_SESSION will have the administrative privileges.
APDU_MESSAGE
APDU_MESSAGE is used to encapsulate and APDU type 4 commands (and other type by generalization). APDU_MESSAGE follows the format define in ISO 7816-4 with the subsequent command and response data fields:
Command Data Field

| 5 bytes | Lc bytes | 1 byte |
|---|---|---|
| CLA\|INS\|P1\|P2\|Lc | APDU Data | Le |

Response Data Field

| Lr bytes | 2 bytes |
|---|---|
| APDU Response Data | SW1 \| SW2 |

END_ADMIN_SESSION

Once the END_ADMIN_SESSION has been executed successfully, no other APDU_MESSAGE can be executed until the next successful INIT_ADMIN_SESSION.

From the foregoing it will be appreciated that the aforementioned improvements to the state of the art allow for a more efficient communication between a smart card 101 and a host computer 103 to which the smart card 101 is connected when using file based communication protocols. In particular, in a system using a host agent 211 program that is stored on the smart card 101 the aforementioned techniques provide for efficient signaling that data is available to be retrieved over the file based IO channel.

Although specific embodiments of the invention have been described and illustrated, the invention is not to be limited to the specific forms or arrangements of parts so described and illustrated. The invention is limited only by the claims.

We claim:

1. A method for providing efficient communication between a computer and a plug-and-play secure token connected to the computer, comprising:
   upon establishing a physical connection between the computer and the plug-and-play secure token, enumerating the secure token as a device of a first type and as a device of a second type;
   launching on the computer a host agent stored on the secure token;
   operating the computer according to instructions of a driver for devices of the first type to receive messages communicated in a first protocol associated with devices of the first type from the secure token;
   operating the computer according to instructions of a driver of devices of the second type to receive messages communicated in a second protocol associated with devices of the second type from the secure token;
   operating the computer according to instructions stored in the host agent to:
      receive messages of a first type from the secure token communicated in the first protocol associated with messages of the first type via the driver for devices of the first type;
      receive messages of a second type from the secure token communicated in the second protocol associated with messages of the second type via the driver for devices of the second type; and
      in response to detecting a message of the first type indicative of an availability of a data in a data buffer, retrieving the available data from the data buffer by sending a message of the second type to the secure token;
   operating the secure token according to instructions of a card-agent program including instructions to:
      write data to a second data buffer of the secure token;
      upon having written data to the second data buffer, sending a message of the first type indicative of the availability of data in the second data buffer;
      upon receiving a message of the second type requesting access to the data buffer, transmitting the contents of the second data buffer using the protocol associated with messages of the second type; and
   operating the computer according to instructions stored in the host agent to:
      transmit messages from the computer to the secure token by writing data to a second data buffer of the secure token using the protocol associated with messages of the second type; and
      embed in the messages from the computer to the secure token messages of an application layer protocol having at least one security level wherein messages embed therein security credentials permitting the computer to perform restricted actions on the secure token.

2. The method of claim 1 further comprising:
   operating the secure token to restrict token updates in encrypted and authenticated sessions;
   transmitting a message to request initialization of an update session from a source computer to the secure token wherein the message to request initialization of an update session includes information authenticating the source computer to the secure token and includes an encrypted shared secret;
   upon receiving the message to request initialization of an update session operating the secure token to decrypt the shared secret and verifying the information authenticating the source computer as authorized to perform volume updates.

3. The method of claim 2 wherein the information authenticating the source computer is a cryptographic signature of the computer.

4. The method of claim 2 further comprising
   upon authenticating the computer to perform volume updates, initiating a secure session for updates by encapsulating authenticating information corresponding to the source computer in a command to the secure token.

5. The method of claim 2 wherein the source computer is one selected from group consisting of a local host computer and a remote computer connected to the secure token over a network via the local host computer.

6. The method of claim 1 wherein the first type is a category of devices for providing user input to a computer and wherein the second type is a category of devices for storing or retrieving a computer data files to or from a token.

7. The method of claim 1, wherein devices of the first type are USB human-interface devices, wherein the step of enumerating the secure token as a device of a first type comprises enumerating the secure token as USB human-interface device, wherein devices of the second type are USB mass storage devices and wherein the step of enumerating the secure token as a device of a second type comprises enumerating the secure token as USB mass storage device.

8. The method of claim 7 wherein the step of operating the secure token to transmit a message of the first type indicative of the availability of data in a data buffer comprises a USB HID in report message.

9. A plug-and-play secure token with means for being connected to a host computer, comprising:
   a memory,
   a card-agent program that upon establishing a physical connection between the host computer and the plug-and-play secure token, enumerating the secure token as a device of a first type and as a device of a second type;
   a host agent stored in the memory of the secure token for execution on the host computer, the host agent comprising:
      a driver for devices of the first type to receive messages communicated in a first protocol associated with devices of the first type from the secure token, and
      a driver of devices of the second type to receive messages communicated in a second protocol associated with devices of the second type from the secure token;
      logic to receive messages of a first type from the secure token communicated in the first protocol associated with messages of the first type via the driver for devices of the first type;
      logic to receive messages of a second type from the secure token communicated in the second protocol associated with messages of the second type via the driver for devices of the second type; and
      logic to in response to detecting that message of the first type indicative of an availability of a data in a data buffer, retrieving the available data from the data buffer by sending a message of the second type to the secure token;
   the card-agent further comprising instructions to cause the secure token to:

write data to a second data buffer of the secure token;
upon having written data to the second data buffer, sending a message of the first type indicative of the availability of data in the second data buffer;
upon receiving a message of the second type requesting access to the data buffer, transmitting the contents of the second data buffer using the protocol associated with messages of the second type and
the host-agent further comprising instructions to cause the host computer to:
transmit messages from the computer to the secure token by writing data to a second data buffer of the secure token using the protocol associated with messages of the second type;
embed in the messages from the host computer to the secure token messages of an application layer protocol having at least one security level wherein messages embed therein security credentials permitting the computer to perform restricted actions on the secure token.

10. The plug-and-play secure token of claim 9 wherein the card-agent further comprising logic to cause the secure token to:
operate the secure token to restrict token updates in encrypted and authenticated sessions;
wherein the host-agent further comprises logic to transmit a message to request initialization of an update session from a source computer to the secure token wherein the message to request initialization of an update session includes information authenticating the source computer to the secure token and includes an encrypted shared secret;
wherein the card-agent further comprises logic to, upon receiving the message to request initialization of an update session, operate the secure token to decrypt the shared secret and verifying the information authenticating the source computer as authorized to perform volume updates.

11. The plug-and-play secure token of claim 10 wherein the information authenticating the source computer is a cryptographic signature of the computer.

12. The plug-and-play secure token of claim 10 wherein the card-agent further comprises instructions to:
upon authenticating the computer to perform volume updates, initiate a secure session for updates by encapsulating authenticating information corresponding to the source computer in a command to the secure token.

13. The plug-and-play secure token of claim 9 wherein the host computer is a local host computer or a remote computer connected to the secure token over a network via a local host computer.

14. The plug-and-play secure token of claim 9 wherein the first type is a category of devices for providing user input to a computer and wherein devices of the second type are typically devices for storing or retrieving a computer data files to or from a token.

15. The plug-and-play secure token of any of claim 9 wherein devices of the first type are USB human-interface devices, wherein the step of enumerating the secure token as a device of a first type comprises enumerating the secure token as USB human-interface device, wherein devices of the second type are USB mass storage devices and wherein the logic to enumerate the secure token as a device of a second type comprises logic to enumerate the secure token as USB mass storage device.

16. The plug-and-play secure token of claim 15 wherein the logic to operate the secure token to transmit a message of the first type indicative of the availability of data in a data buffer comprises a USB HID in report message.

* * * * *